United States Patent [19]
DeBerg

[11] 4,191,507
[45] Mar. 4, 1980

[54] WINDMILL

[76] Inventor: Gary J. DeBerg, 735 Elmwood, Lincoln, Nebr. 68510

[21] Appl. No.: 925,423

[22] Filed: Jul. 17, 1978

[51] Int. Cl.$^2$ ............................................. F03D 3/06
[52] U.S. Cl. ............................ 416/117; 416/132 B; 416/197 A; 416/240
[58] Field of Search ............ 416/17, 117, 118, 197 A, 416/122, 132 B, 240 A

[56] References Cited

U.S. PATENT DOCUMENTS

| | | | |
|---|---|---|---|
| 242,211 | 5/1881 | McIlvaine | 416/132 B X |
| 330,168 | 11/1885 | Tallerday | 416/132 B X |
| 662,737 | 11/1911 | Puszkar | 416/197 A |
| 802,144 | 10/1905 | Harrington | 416/240 A X |
| 802,791 | 10/1905 | Abbey | 416/117 |
| 835,667 | 11/1906 | Donnelly | 416/132 B |
| 1,024,700 | 4/1912 | Rikhoff | 416/117 X |
| 1,178,665 | 4/1916 | Muller | 415/2 |
| 2,319,286 | 5/1943 | Andresen | 416/132 B X |
| 3,810,712 | 5/1974 | Hillman | 416/117 |
| 3,995,170 | 11/1976 | Graybill | 416/132 B X |

FOREIGN PATENT DOCUMENTS

| | | | |
|---|---|---|---|
| 232859 | 4/1911 | Fed. Rep. of Germany | 416/132 B |
| 2289767 | 5/1976 | France | 415/2 |

*Primary Examiner*—Everette A. Powell, Jr.
*Attorney, Agent, or Firm*—Vincent L. Carney

[57] ABSTRACT

To reduce drag in a lightweight windmill, a vertical centrally located frame has three vertical windmill-vane arrays extending radially outward therefrom spaced circumferentially 120 degrees from each other about the rotatable framework. Each vane array includes a plurality of flat flexible sails rigged one under the other between leading and trailing horizontal arms in the array with an upper leading edge of each sail being directly fastened to a different one of the leading arms and a lower edge of each sail being fastened by flexible cords to a different one of the trailing arms so that when the wind blows in the direction of the leading arm, the sail billows outwardly to turn the framework but when the wind blows in the opposite direction the sails are lifted flat to provide low drag. In one embodiment, the arms are cables, stretched radially from the central vertical framework by other cables so that the entire structure is easily disassembled for shipment. The structure is made of hollow aluminum tubes, cords and fabric sails so as to be lightweight and efficient.

10 Claims, 5 Drawing Figures

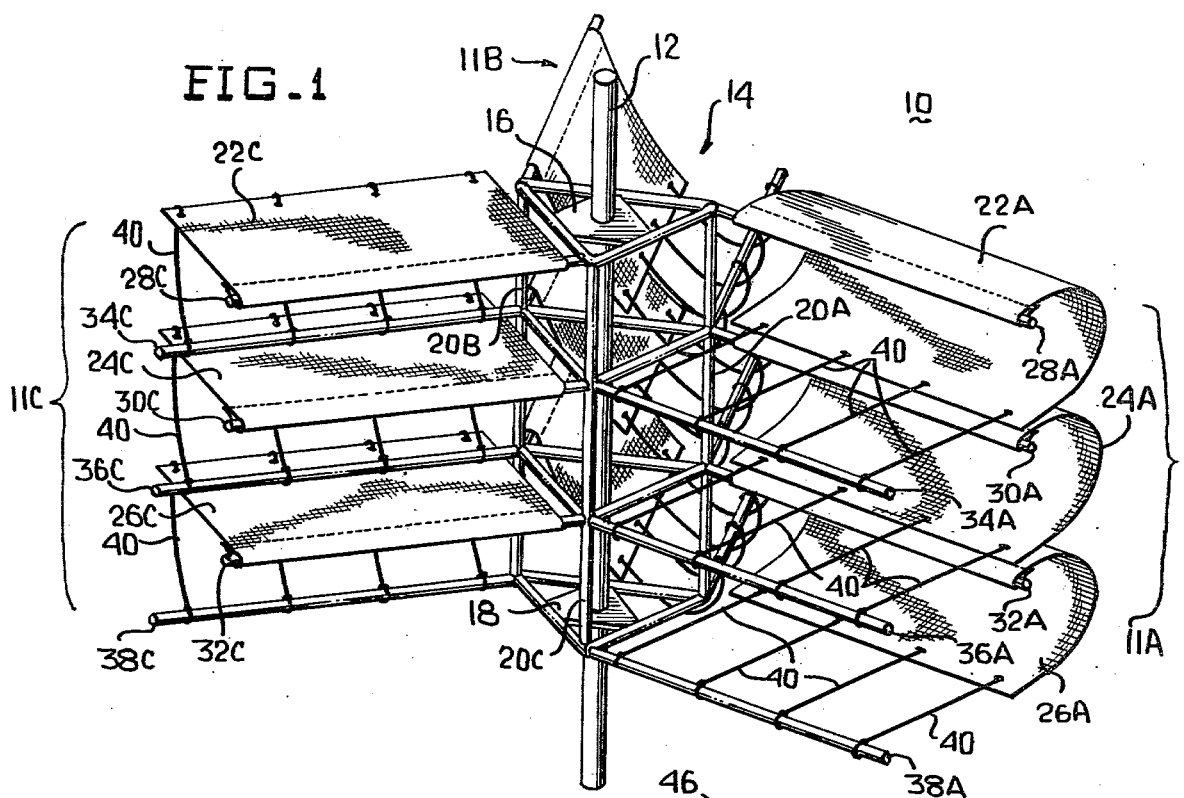
FIG.1
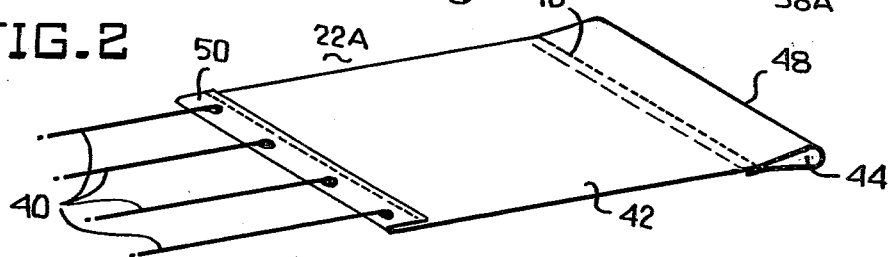
FIG.2
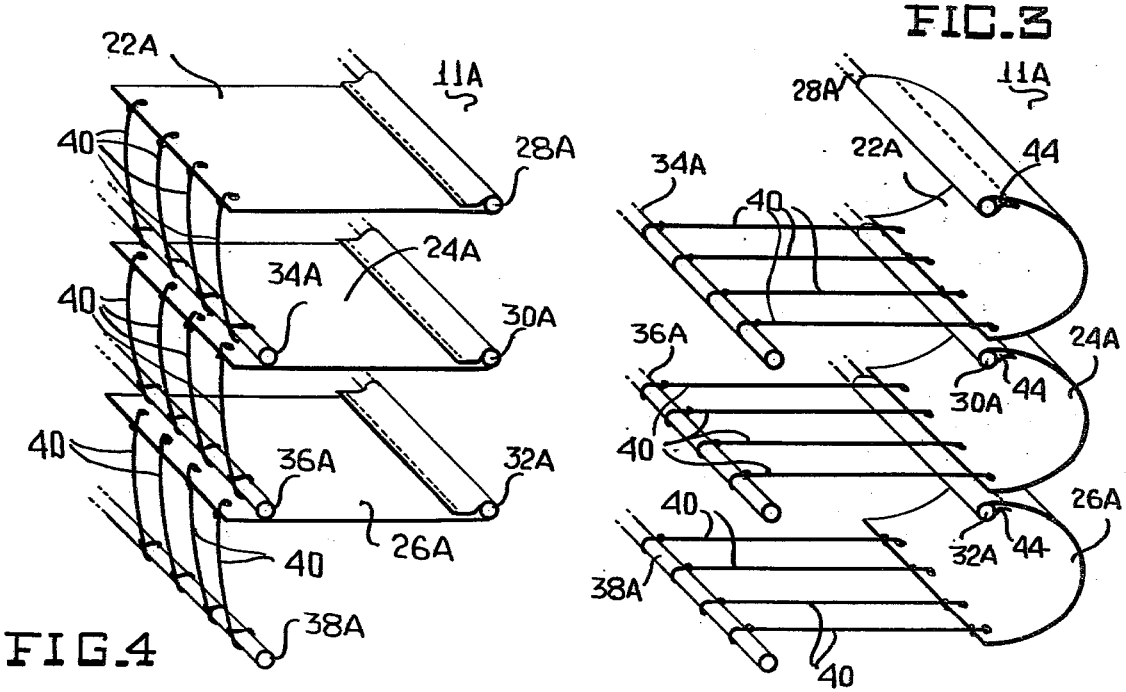
FIG.3
FIG.4

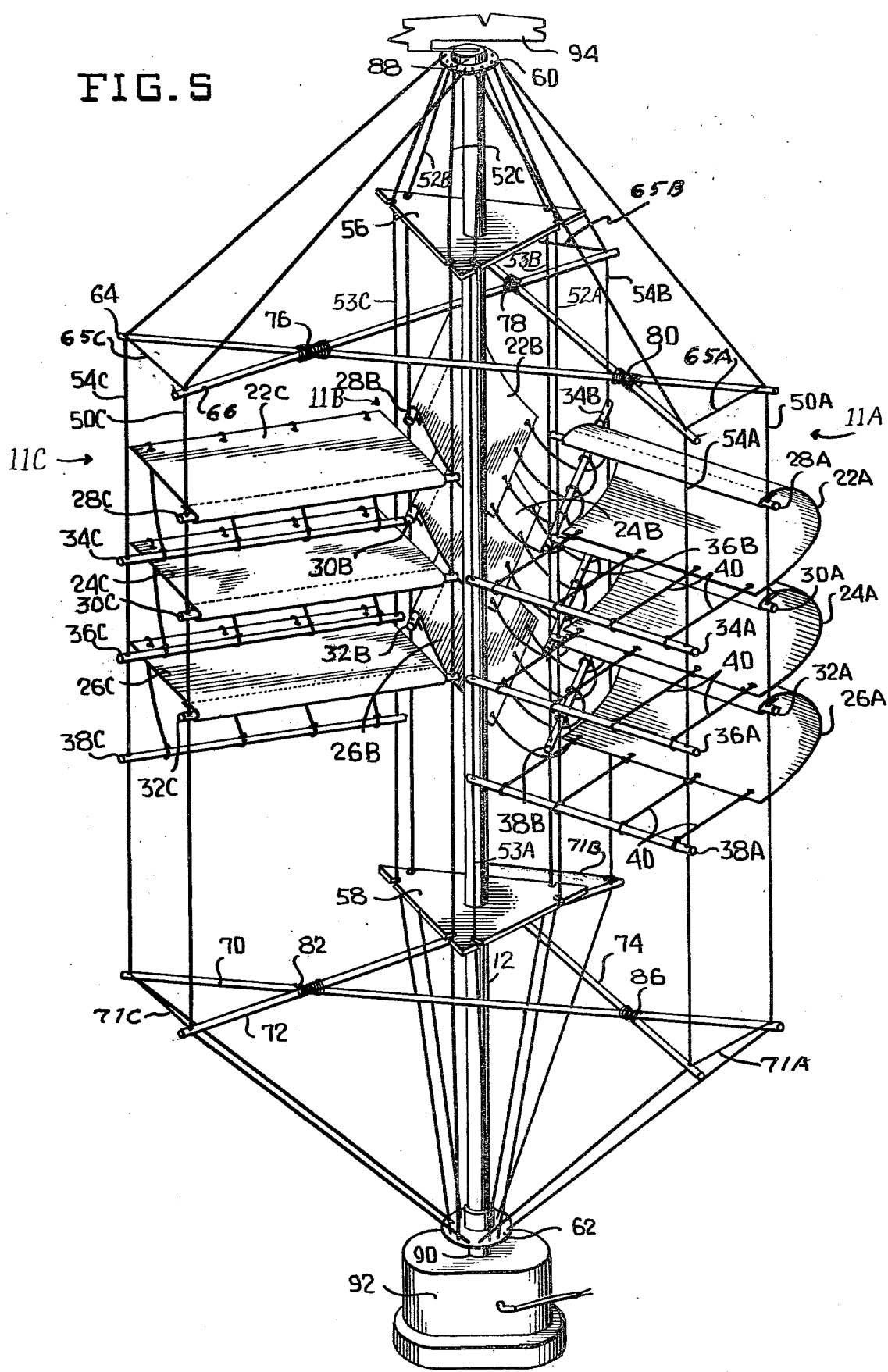

WINDMILL

This invention relates to windmills.

In one class of windmill, a vertical rotatable shaft has horizontal arms extending from its bearing sails which are substantially vertical when rotated to a position for receiving the wind from one side to turn the shaft and fold upwardly to provide low drag when rotated to other positions.

In a prior art type of windmill of this class, the sails are wings which pivot about a horizontal strut from a vertical position to a horizontal position in one direction to reduce drag and pivot downwardly to a horizontal position in which they are stopped by a rigid member to catch the wind in the other direction. The wings are substantially rigid and maintain their shape during the pivoting action to receive the full force of the wind when in a vertical position and to provide low drag when in a horizontal position.

The prior art type of windmill has the disadvantages of being heavy, rigid, expensive and subject to mechanical failure from metal fatigue.

Accordingly, it is an object of the invention to provide a novel windmill.

It is a further object of the invention to provide a lightweight, durable windmill.

It is a still further object of the invention to provide a windmill having sails mounted to a frame along opposite edges in a manner that permits them to receive the force of the wind in one direction and to provide low drag in the other direction.

It is a still further object of the invention to provide a portable, easily-collapsible windmill.

In accordance with the above and further objects of the invention, a windmill includes a framework having outwardly extending arms which support sails. The sails are mounted along one of their edges to the arms and at the other edges to other arms by flexible cords which permit them to billow outwardly in one direction for high wind resistance and to flatten against the wind in the other direction for low wind resistance. The windmill structure is formed of hollow tubes, flexible sails and cords so as to be lightweight and easily disassembled.

As can be understood from the above description, this invention has the advantages of: (1) being relatively light; (2) being easily disassembled and transported; (3) being inexpensive; (4) providing low drag; and (5) being durable.

The above noted and other features of the invention will be better understood from the following detailed description when considered with reference to the accompanying drawings in which:

FIG. 1 is a simplified perspective view of one embodiment of the invention;

FIG. 2 is a perspective view of a portion of the embodiment of FIG. 1;

FIG. 3 is an illustrative perspective view of a portion of the embodiment of FIG. 1;

FIG. 4 is an illustrative perspective view of a portion of the embodiment of FIG. 1 in another state of operation; and FIG. 5 is a perspective view of another embodiment of the invention.

In FIG. 1, there is shown a windmill 10 having a centrally located triangular framework 14 supporting three circumferentially-spaced windmill vane arrays 11A–11C. The triangular frame 14 and vane arrays 11A–11C are rotated by wind to provide torque for use in a conventional manner such as for the generation of electrical power of the pumping of water or the like.

To rotatably support the vane arrays 11A–11C, the triangular frame 14 includes a vertical central axle 12, a top triangular support plate 16, and a bottom triangular support plate 18. The central shaft 12 and the plates 16 and 18 are mounted within a skeletal prism formed of three parallel, vertical support pipes 20A–20C and a plurality of horizontal connecting pipes, each pair of vertical support pipes being connected by four horizontal parallel pipes to form three vertical identical sides of the skeletal prism.

Each of the three horizontal sides of the prism supports a different one of the windmill vane arrays 11A–11C. These vane arrays are identical and only vane array 11A will be described, it being understood that vane arrays 11B and 11C are constructed in the same manner and operate in the same way. The corresponding parts of vane arrays 11B and 11C have the same reference numerals in the drawings as vane 11A, except that the suffixes correspond to the vane.

To apply torque to the triangular framework 14, the vane array 11A includes three sails 22A, 24A, and 26A, mounted one beneath the other. Each of the sails 22A–26A are of a flexible fabric or plastic capable of catching the wind and billowing outwardly. They are substantially rectangular in shape and mounted at their top and bottom edges to the windmill 10 in a manner to be described hereinafter.

To mount the sails 22A, 24A and 26A to the triangular frame 14, each of the three sides of the frame have a plurality of sail arms and cord arms extending horizontally therefrom. In FIG. 1, there are shown for illustration three such sail arms 28A, 30A and 32A extending horizontally from the support column 20A and three such cord arms 34A, 36A and 38A extending horizontally from the support column 20C, parallel to the sail arms 28A, 30A and 32A.

The sail 22A is fastened at one edge to the sail arm 28A and at its other end to a plurality of cords 40 which connects its opposite edge to a cord arm 34A positioned parallel to the sail arm 28A but at a location lower and spaced horizontally from the sail arm 28A. The cords 40 are just sufficiently long to permit the sail 22A to billow with its edges being located horizontally one under the other when receiving the wind fully on its face blowing in a direction tangential to the direction of rotation of the windmill.

Similarly, sails 24A and 26A are fastened at their upper ends to sail arms 30A and 32A respectively and are fastened by cords 40 at their lower ends to cord arms 36A and 38A respectively. Cord arm 34A is in the same horizonal plane as sail arm 30A and cord arm 36A is in the same horizontal plane as sail arm 32A with sail arm 28A being at the top of the vane array 11A and cord arm 38A at the bottom.

In FIG. 1, there is shown a windmill with the wind direction directly from the cord arms of vane 11A toward the sail arms of 11A causing the sails 22A, 24A and 26A to billow outwardly and receive full force from the wind. The vane 11B has its sails at an acute angle to the wind direction and thus is receiving very little force and the vane 11C has the wind blowing from the opposite direction so as to lift the sails 22C–26C flat to provide little resistance to the wind.

In FIG. 2, there is shown the sail 22A in a simplified perspective view illustrating its construction. Preferably, it is rectangular and formed of a fabric or other flexible material. A center portion 42 has a sail arm receiving portion 48 at one end and a cord receiving portion 50 at the other end. The sail arm receiving portion 48 is in the form of a hem stitched at 46 in a direction parallel to an edge 48 to form a loop 44 which receives the sail arm. At the other end, a hem 50 includes a plurality of holes each of which receives a different cord 40 for binding the hem 50 to a cord arm (not shown in FIG. 2).

In FIG. 3, there is shown the sails 22A-26A of the vane array 11A with the wind blowing directly from the cord arms to the sail arms. The cord arms are trailing arms and the sail arms leading arms in the sense that the wind turns the windmill in such a direction that the sail arms precede the cord arms of the same vane. This occurs because the wind billows the sails 22A-26A outwardly when it blows from the cord arm to the sail arms, extending the flexible members 40 their full length.

The sails 22A-26A are sufficiently long so that they extend from one sail arm to another when billowed outwardly, thus forming a complete vertical wall extending from sail arm 28A to sail arm 30A, from sail arm 30A to sail arm 32A and downwardly for the length of the sail 26A.

The vertical distance between the said arms and the lengths of the sails are selected for convenience and so that the sail arms will occupy the entire space and make the maximum use of the height of the vane array to create maximum torque to turn the windmill 10 (FIG. 1). The cords 40 are sufficiently long to stretch between the cord arms and the sail arms, which are horizontally positioned with respect to each other. In this manner, the sails when receiving the full force of the wind extend one under the other. The cord arms are positioned lower than the corresponding sail arms and offset horizontally from the sail arms the length of the cords so that the top and bottom edges of the sail are vertical under each other with the sail billowed.

In FIG. 4, there is shown the vane array 11A turned so that the wind is blowing directly into it from the leading edge to the trailing edge This is also the position of the vane 11C (FIG. 1) shown above. With the wind blowing from the leading edge to the trailing edge (from the sail arms 28A-32A to the cord arms 34A-38A) the sails 22A-26A are moved horizontally by the wind, with the cords 40 winding downward from the edges of the sails to the cord arms. Thus it can be seen that the distance between the sail arms and the cord arms are efficiently positioned to be equal to the length of the sails and the distance vertically between cord arms is slightly less than the length of the cords 40 to permit the sails 22A-26A to become horizontal for minimum wind resistance and drag.

Of course, the sails and cords may be of different lengths. If the cords are shorter, there will be an increased resistance since the sails will be held at an angle. If the sails are shorter, then some power is lost because the wind will escape between the sails when the wind is blowing from the trailing arm to the leading arm in the direction shown in FIG. 3. Similarly, instead of a vertical windmill a horizontal windmill may be used or a windmill at any other angle. The arms may also be at angles although a vertical windmill with horizontal arms is believed to be the most suitable.

The windmill will operate with rigid sails but some durability and efficiency in use is lost by rigid sails and fabric sails are preferred. The tubes of the frame 14 and the cord and sail arms are preferably hollow aluminum tubes to provide minimum weight and portability. The rotatable axle 12 is best mounted with bearings at either end and any kind of a power takeoff for pumping water or for an electric generator or the like in a manner known in the art.

In FIG. 5, there is shown another embodiment of windmill which is fully collapsible for easier portability. In this windmill, the cord arms, the sail arms and the sails are positioned identically to the corresponding parts in the embodiment of FIG. 1 and form vanes which are substantially the same but differ in the manner in which they are supported on the windmill. These parts bear numbers which are identical to the embodiment of FIG. 1.

The sail arms 28A-28C, 30A-30C and 32A-32C are held at their two ends by cables, with the outer end of the sail arms in vanes 11A-11C being held by corresponding ones of the cables 50A-50C. The cables 50A-50C each have a vertical section spaced from each other circumferentially 120 degrees apart at a distance from the center axle 12 corresponding to the ends of the sail arms (50B not shown in FIG. 5). In each of the vanes 11A-11C, the sail arms are fastened one under the other to the vertical section at distances corresponding approximately to the length of the sails.

Similarly, the cord arms 34A-34C, 36A-36C and 38A-38C are held by cables at each of their ends. The outer ends of the cord arms in the vanes 11A-11C are fastened to corresponding ones of the cables 54A-54C, with the cables 54A-54C being circumferentially spaced from each other 120 degrees about the shaft 20 and at a radial distance from the shaft corresponding substantially to the ends of the cord arms. The outer ends of the cord arms in each of the vanes are spaced directly one under the other at locations offset from sail arms by the length of the cords 40 which is substantially the same as the lengths of the sails in the same manner as in the embodiment of FIG. 1.

The inner ends of the cord and sail arms are fastened to the cables which form three edges of a prism corresponding in location to the pipes 20A-20C in the embodiment of FIG. 1. In FIG. 5, six such cables 52A-52C and 53A-53C are shown for clarity although it is only necessary to use three cables. The individual cables if three are used or pairs of cables if six are used are spaced circumferentially from each other 120 degrees and are positioned a radial distance from the central axle 12 corresponding to the inner ends of the sails and cord arms.

The inner ends of the sails and cord arms are fastened to the cables at locations which maintain the sail and cord arms horizontal and perpendicular to the axle 12. The sail arms in vane 11A and the cord arms in the vane 11B are fastened to the cables 52A and 53B respectively; the sail arms of the vane 11B and cord arms of the vane 11C are fastened to the cables 52B and 53C respectively; and the sail arms of the vane 11C and the cord arms of the vane 11A are fastened to the cable 52C and 53A respectively. Since the cables are spaced together to form three pairs of cables, with each pair being adjacent, a single cable can be substituted for each of the three pairs, which are: (1) 52A and 53B; (2) 52B and 53C; and (3) 52C and 53A.

In one embodiment the cord and sail arms are cables held taut by the cables 52A–52C, 54A–54C, 50A–50C and 53A–53C. The cables 52A–52C, 54A–54C, 50A–50C and 53A–53C are tightened by turnbuckles (not shown) so as to provide sufficient support. In another embodiment the cord and sail arms are hollow tubes which are inherently stiff.

To space the cables 52A–52C and 53A–53C to form the edges of a prism, a first triangular spacer 56 is fastened to the axle 12 above the sail arms and a second triangular spacer 58 is fastened below the sail arms. A circumferential aperture in the triangulr spacers 56 and 58 receives the axle 12 and is welded or fastened thereto by any suitable means. Each of the corners of the triangular spacer has a different one of the cables 52A–52C and 53A–53C fastened to it for spacing the edges of the prism.

To space the cables 50A–50C, three pipes 64, 66 and 68 are fastened together above the vane arrays 11A–11C and about the axle 12 and three different pipes 70, 72 and 74 are arranged in a similar manner below the vane arrays 11A–11C. The pipes 64, 66 and 68 cross each other to form an inner triangle, the center of which receives the axle 12 and the ends of which extend beyond the triangle with portions passing to positions aligned with the ends of the sail arms and the cord arms of the vanes 11A–11C. The pipes 70, 72 and 74 similarly cross each other.

To aid in holding the pipes 64, 66 and 68 in place, in one embodiment the ends of the crossed pipes are fastened by cables. To this end, the ends of pipes 64 and 66 are connected by a cable 65C and the ends of pipes 70 and 72 are connected by a cable 71C in vane 11C. Similarly: (1) in vane 11A, the ends of the pipes 68 and 64 are connected by cable 65A and the ends of pipes 70 and 74 are connected by cable 71A; and (2) in vane 11B, the ends of the pipes 66 and 68 are connected by cable 65B and the ends of the pipes 74 and 72 are connected by cable 71B. This embodiment together with cables for sail and cord arms provides continual flexibility to permit the sails to move and receive maximum wind as the axle 12 turns.

In another embodiment, the pipes 64 and 66 are fastened at their intersection by a band 76, the pipes 64 and 68 are fastened by a band 80 and the pipes 68 and 66 are fastened by a band 78. Similarly, in the bottom spacer, the pipes 70 and 72 are fastened by a band 82, the pipes 70 and 74 are fastened by a band 86 and the pipes 72 and 74 are fastened by a band not shown in FIG. 5. Although both cable and bands are shown fastening the pipes in FIG. 5, one or the other is used rather than both.

The cables 50A–50C are fastened respectively to the outer ends of the pipes 64, 66 and 68 and to the outer ends of the pipes 70, 72 and 74 respectively. Similarly, the cables 54A–54C are fastened to the outer ends of the pipes 68, 66 and 64 respectively and to the outer ends of the pipes 74, 72 and 70 respectively.

To aid in holding the cables 50A–50C, 52A–52C, and 54A–54C in place, each of the cables is fastened at its upper end to the axle 12 by a collar 60 and at its bottom end to the axle 12 by a collar 62. The axle 12 rotates at its upper end in a bearing 88 and at its bottom end in a bearing 90, with the axle 12 extending downwardly into the generator 92 where it is geared to the generator for the generation of power. At the upper end, a frame 94 aids in supporting the windmill and for that purpose is fastened to the bearing 88. Instead of fastening the cables 52A–52C and 53A–53C to the collars 60 and 62 they may be fastened to the spacers 56 and 58 which may be fastened to the axle 12.

As can be understood from the previous description, the embodiments of FIG. 1 and FIG. 5 operate in substantially the same manner. Wind blowing into FIG. 1 and FIG. 5 force the sails 22A–26A outwardly so that their upper edges pull against the sail arms 28A, 30A and 32A and their bottom edges pull against the cords 40 which are fastened to the cord arms 34A, 36A and 38A. This causes a rotational torque to be applied to the axle 12. The same wind passes in a direction at an acute angle to the sail and cord arms of vane 11B and very little torque in either direction is created. At the same time, the wind blows from the sail arms to the cord arms of vane 11C moving it to a horizontal position, in which position very little torque is transmitted.

Although the embodiments of FIG. 1 and FIG. 5 operate in the same manner, the embodiment of FIG. 5 has the advantage of being collapsible. The cords may be detached from the collars 60 and 62, thus permitting the spacers and the arms to be removed and folded for easier transportation.

Moreover, since fewer pipes are necessary, particularly with larger vane arrays, the windmill is lighter. In both embodiments, a larger number than the three illustrative sails may be used in each vane.

From the above description it can be seen that the windwill of this invention has several advantages such as: (1) it is light in weight; (2) it does not include metal parts which move with respect to each other and are subject to metal fatigue; (3) in some embodiments in may be easily collapsed for shipment into small individual members; (4) has high efficiency and low drag; and (5) is economical in cost and operation.

Although specific embodiments have been described with some particularity, many modifications and variations in those embodiments are possible without deviating from the invention. Accordingly, it is to be understood that, within the scope of the appended claims, the invention may be practiced other than as specifically described.

What is claimed is:

1. A windmill comprising:

a rotatable member;

said rotatable member having a first plurality of sail supports extending at an angle thereto;

a plurality of sails;

means for causing said sails to billow outwardly when wind impinges upon them from one direction and to move to a flat low drag position when wind impinges upon them from another direction;

said sails being flexible;

said means for causing said sails to billow outwardly including a second plurality of sail supports;

each of said second plurality of said supports corresponding to a different one of said first plurality of sail supports and extending parallel thereto;

each of said second plurality of sail supports being spaced from its corresponding first sail support by a first distance in the direction of said rotatable member and in a second direction orthogonal to said corresponding first sail support;

each of said sails being attached to a different one of said first plurality of sail supports with one edge of said sail being in close proximity to said sail support;

a plurality of elongated members;

the other end of each of said sails being attached to one end of certain different ones of said elongated members;

the other ends of said certain plurality of elongated members being attached to a corresponding one of said second plurality of sail supports; and said elongated members having a length approximately equal to said first distance and said second distance, whereby when said sails billow outwardly their lower edges are substantially beneath their upper edges and when said sails are in a flat low drag position said elongated members stretch upwardly from a corresponding one of said sail supports to the trailing edge of said sail.

2. A windmill in accordance with claim 1 in which said supports are substantially horizontal and said elongated flexible members are below the upper edge of said sails.

3. A windmill in accordance with claim 2 in which said rotatable member is substantially vertical.

4. A windmill in accordance with claim 3 in which said sail supports are rigidly attached to said vertical rotatable member.

5. A windmill in accordance with claim 3 in which said supports are mounted by cables to said rotatable member.

6. A windmill in accordance with claim 5 in which said elongated members are substantially of the same length as said sails and as the distance horizontally between a line of cord support and a line of sail supports.

7. A windmill in accordance with claim 6 including: three vanes;

each of said vanes including a vertical row of said first plurality of sail supports and a vertical row of said second plurality of sail supports spaced circumferentially about said rotatable member from said first plurality of sail supports; and the upper edge of each of said sails being attached to a different one of said first plurality of sail supports and the lower edge being attached by said elongated members to a lower circumferentially spaced one of said second plurality of sail supports.

8. A windmill in accordance with claim 1 in which said supports are mounted by cables to said rotatable member.

9. A windmill in accordance with claim 8 in which said elongated members are substantially of the same length as said sails and as the distance horizontally between a line of cord support and a line of sail supports.

10. A windmill in accordance with claim 9 including: three vanes;

each of said vanes including a vertical row of first plurality of sail supports and a vertical row of second plurality of sail supports spaced circumferentially about said rotatable member from said first plurality of sail supports; and the upper edge of each of said sails being attached to a different one of said first plurality of sail supports and the lower edge being attached by said elongated members to a lower circumferentially spaced one of said second plurality of sail supports.

* * * * *